(12) United States Patent
Cheng (10) Patent No.: US 11,023,017 B2
(45) Date of Patent: Jun. 1, 2021

(54) HINGE FOR ROTATING PART AND A MOBILE TERMINAL

(71) Applicant: Hangzhou Amphenol Phoenix Telecom Parts Co., Ltd., Zhejiang (CN)

(72) Inventor: Guanlun Cheng, Zhejiang (CN)

(73) Assignee: Hangzhou Amphenol Phoenix Telecom Parts Co., Ltd., Zhejiang (CN)

( * ) Notice: Subject to any disclaimer, the term of this patent is extended or adjusted under 35 U.S.C. 154(b) by 0 days.

(21) Appl. No.: 16/486,462

(22) PCT Filed: Apr. 9, 2018

(86) PCT No.: PCT/CN2018/082287
§ 371 (c)(1),
(2) Date: Aug. 15, 2019

(87) PCT Pub. No.: WO2018/149420
PCT Pub. Date: Aug. 23, 2018

(65) Prior Publication Data
US 2020/0233467 A1    Jul. 23, 2020

(30) Foreign Application Priority Data
Feb. 16, 2017 (CN) .......................... 201720137458.0

(51) Int. Cl.
*G06F 1/16* (2006.01)
*E05D 11/10* (2006.01)

(52) U.S. Cl.
CPC ........ *G06F 1/1681* (2013.01); *E05D 11/1007* (2013.01); *G06F 1/1616* (2013.01)

(58) Field of Classification Search
CPC ....................................................... H05K 5/00
See application file for complete search history.

(56) References Cited

U.S. PATENT DOCUMENTS

| 6,606,762 | B1 | 8/2003 | Levine et al. | |
| 2005/0220294 | A1* | 10/2005 | Gupte | E05F 1/1223 |
| | | | | 379/433.13 |

FOREIGN PATENT DOCUMENTS

| CN | 202140417 U | 2/2012 |
| CN | 205841477 U | 12/2016 |

(Continued)

*Primary Examiner* — Jerry Wu
(74) *Attorney, Agent, or Firm* — Muncy, Geissler, Olds & Lowe, P.C.

(57) ABSTRACT

The present utility model discloses a hinge for rotating part, and the hinge comprises a first cam, a second cam, a fixed cam, a slide cam, a spring and a damper, and further discloses a mobile terminal that uses the hinge. The hinge for rotating part provided in the present utility model has the advantages of simple structure and easy assembling. It can be connected with a third rotating body in addition to two relatively rotatable bodies, and can achieve independent rotation and linkage of the second rotating body and the third rotating body according to the designed rotation procedure as required and achieve self-locking of hinge, and the third rotating body can be damped and buffered at the end of the rotating stroke. The hinge of the present utility model can be applied to the connection of various three rotating bodies, especially suitable for the connection of bracket, keyboard and screen in the mobile terminal. It is easy to open and close and it can provide stable support when the mobile terminal is within the range of opening angles.

8 Claims, 7 Drawing Sheets

(56) References Cited

FOREIGN PATENT DOCUMENTS

| | | |
|---|---|---|
| CN | 205896595 U | 1/2017 |
| CN | 206608457 U | 11/2017 |
| KR | 20090077351 A | 7/2009 |

\* cited by examiner

HINGE FOR ROTATING PART AND A MOBILE TERMINAL

FIELD OF THE INVENTION

The present utility model relates to a mobile terminal and a hinge thereof, and the mobile terminal may be an electronic product such as a notebook computer, a pad, a mobile phone or a game machine, etc.

BACKGROUND OF THE INVENTION

At present, many portable electronic products such as notebook computers and tablet computers are equipped with brackets to support stably, and more requirements are proposed for the movement manner of the brackets.

SUMMARY OF THE INVENTION

The first technical problem to be solved by the present utility model is to provide a hinge for rotating part, which can be connected to a mobile terminal, to provide independent movement or linkage function of a plurality of rotating bodies and present a damping function. To achieve this object, the present utility model adopts the following technical solutions:

A hinge for rotating part, comprising a rotating shaft, wherein the hinge comprises a first set of rotating components and a second set of rotating components, the first set of rotating components rotate around the rotating shaft, and the second set of rotating components rotate around the rotating shaft, the second set of rotating components comprises a cam that can slide along the rotating shaft and rotate around the rotating shaft; the hinge is further provided with a damper, and the damper is connected with the rotating shaft by a clutch mechanism, when the rotation stroke of the cam that can slide along the rotating shaft and rotate around the rotating shaft in any direction is close to end, the damper is connected to the rotating shaft, and when the rotation stroke of the cam that can slide along the rotating shaft and rotate around the rotating shaft in any direction starts, the damper is not connected to the rotating shaft.

On the basis of the foregoing technical solution, the utility model further adopts the following technical solutions:

The damper is provided with a shaft and a connecting housing, the connecting housing is a component in the second set of rotating components, and damping oil is disposed between the shaft and the connecting housing, the clutch mechanism comprises a coupling and a pin cooperating with the coupling, one of the coupling and the pin is coupled to the shaft of the damper, and the other of the coupling and the pin is coupled to the rotating shaft.

The first rotating component comprises a first cam and a first rotating bracket, the first cam being axially positioned outside the rotating shaft and rotating around the rotating shaft;

The second set of rotating components further comprises a second rotating bracket, and the cam in the second rotating component being a second cam;

The hinge further comprises a fixed cam and a slide cam; the fixed cam is fixed on the rotating shaft and cannot be displaced and rotated relative to the rotating shaft; the slide cam is sleeved outside the rotating shaft and cannot rotate relative to the rotating shaft but can slide along the rotating shaft;

The first cam and the second cam are respectively positioned outside the two ends of the slide cam and cooperate with the slide cam, and the two ends of the slide cam have a first cam structure that cooperates with the first cam and a second cam structure that cooperates with the second cam respectively;

The second cam is provided with a third cam structure that cooperates with the fixed cam and a fourth cam structure that cooperates with the slide cam and the second cam structure;

The hinge is further provided with a spring for applying a thrust to the second cam in the direction of the slide cam;

When the hinge is in a closed state, the second rotating bracket provides a locking force of the hinge relying on the spring's thrust to the second cam and the cooperation of the third cam structure and the fixed cam.

The side of the slide cam near the first cam is slidably connected to the rotating shaft, and the side of the slide cam near the second cam has a space for accommodating the fixed cam, and the fixed cam is in the space when the hinge is in a closed state.

A torque mechanism is disposed between the first rotating bracket and the rotating shaft, to provide a function for the first rotating bracket to stop rotating and maintain a rotation angle at any time.

The first rotating bracket is connected to a friction sleeve that is sleeved outside the rotating shaft, and the friction sleeve cooperates with the rotating shaft to provide a function for the first rotating bracket to stop rotating and maintain a rotation angle at any time.

The second cam is provided with an extension sleeve, and the extension sleeve is slidably and rotationally engaged with the rotating shaft, and the spring is sleeved outside the extension sleeve.

The hinge is provided with a housing, the spring and the second cam are in the housing, the housing is fixedly connected with the second rotating bracket, and the second cam is slidably connected with the housing but cannot rotate relative to each other.

The third cam structure and the fourth cam structure of the second cam are respectively positioned on end faces of concentric rings having different radii on the second cam, and the third cam structure is positioned on the end face of inner ring of the second cam, the fourth cam structure is positioned on the end face of the ring outside the inner ring, and the cooperation of the second cam and the slide cam and the cooperation of the second cam and the fixed cam are switched at different stages of opening and closing of the hinge.

The hinge has a critical angle, a maximum opening angle of a second rotating bracket, a maximum opening angle of a first rotating bracket; the critical angle is smaller than the maximum opening angle of the first rotating bracket, and the maximum opening angle of the first rotating bracket is smaller than the maximum opening angle of the second rotating bracket;

During the process from hinge closed state to the critical angle rotated by the first rotating bracket, the second rotating bracket is driven by the rotation of the first rotating bracket to drive the second cam to rotate, at the same time, the second cam climbs along the fixed cam such that the second cam slides away from the first cam when rotating, to compress the spring;

After rotating to a critical angle during the opening process, the second rotating bracket is automatically opened to a maximum opening angle by the thrust of the spring and the cooperation of the third cam structure and the fixed cam;

After the critical angle, there are a slot and an insertion portion that are interposed each other and allow the first cam to rotate by a certain angle between the first cam and the first cam structure of the slide cam, and the certain angle is an angle to allow the first rotating bracket to be adjusted at random after the second rotating bracket is opened to the maximum opening angle of the second rotating bracket, and the second rotating bracket is kept at the maximum opening angle, when the first rotating bracket continues to rotate beyond the critical angle during the opening, the second cam pushes the slide cam to slide to the first cam, and the insertion portion falls into the slot;

During the rotation from the critical angle to the closing of the first rotating bracket, the first cam pushes the slide cam to slide toward the second cam, and with the cooperation of the fourth cam structure and the second cam structure and the cooperation of the third cam structure and the fixed cam, the second cam rotates toward the critical angle along the closing direction at a speed faster than the first rotating bracket and slides away from the first cam to compress the spring;

After rotating to a critical angle during the closing process, the second rotating bracket is automatically rotated to close and push the second cam toward the first cam by the thrust of the spring and the cooperation of the third cam structure and the fixed cam or the cooperation of the fourth cam structure and the second cam structure.

The cooperation of the third cam structure and the fixed cam is the cooperation of a pit and a bump corresponding to the maximum rotation angle of the second rotating bracket.

Another technical problem to be solved by the present utility model is to provide a mobile terminal to which the above hinge is applied. To this end, the utility model adopts the following technical solutions:

A mobile terminal comprising a first body and a second body that are rotationally connected, wherein the mobile terminal is further provided with any one of the foregoing described hinges, the rotating shaft is connected with the first body, and the second body is connected with the first rotating bracket.

Because of the foregoing technical solutions, the hinge for rotating part provided in the present utility model has the advantages of simple structure and easy assembling. It can be connected with a third rotating body in addition to two relatively rotatable bodies, and can achieve independent rotation and linkage of the second rotating body and the third rotating body according to the designed rotation procedure as required and achieve self-locking of hinge, and the third rotating body can be damped and buffered at the end of the rotating stroke. The hinge of the present utility model can be applied to the connection of various three rotating bodies, especially suitable for the two-in-one notebook computers with detachable bracket, keyboard and screen. It is easy to open and close and it can provide stable support when the mobile terminal is within the range of opening angles.

DETAILED DESCRIPTION

Figure 1:
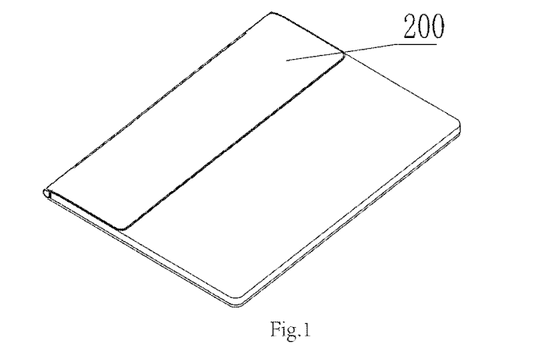
FIG. 1 is a schematic view showing the hinge provided by the present utility model in a closed state when applied to a mobile terminal.
Figure 2:
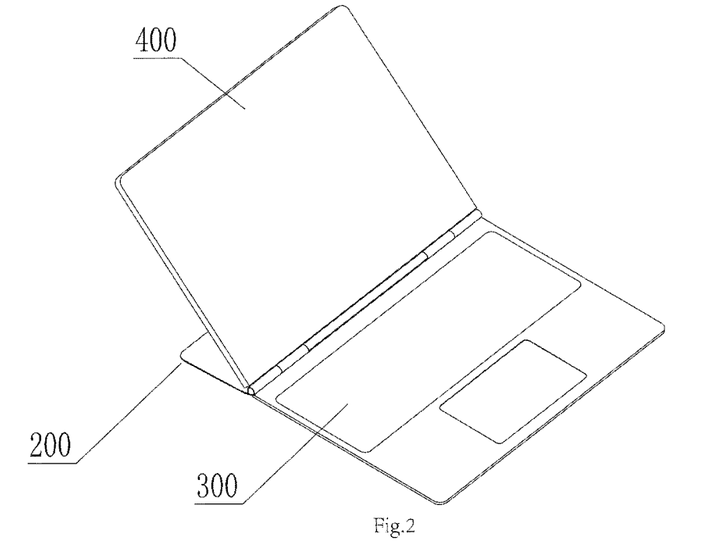
FIG. 2 is a schematic view of the hinge provided by the present utility model when the second rotating bracket and the first rotating bracket are both at their maximum opening angles when applied to a mobile terminal.
Figure 3:
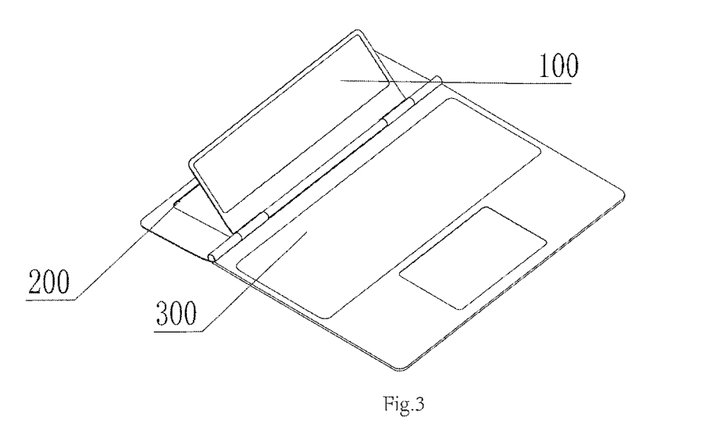
FIG. 3 is a schematic view of the second rotating bracket and the first rotating bracket after removing the Pad or the host in the state shown in FIG. 2.
Figures 4, 5, 6, 7, 7A:
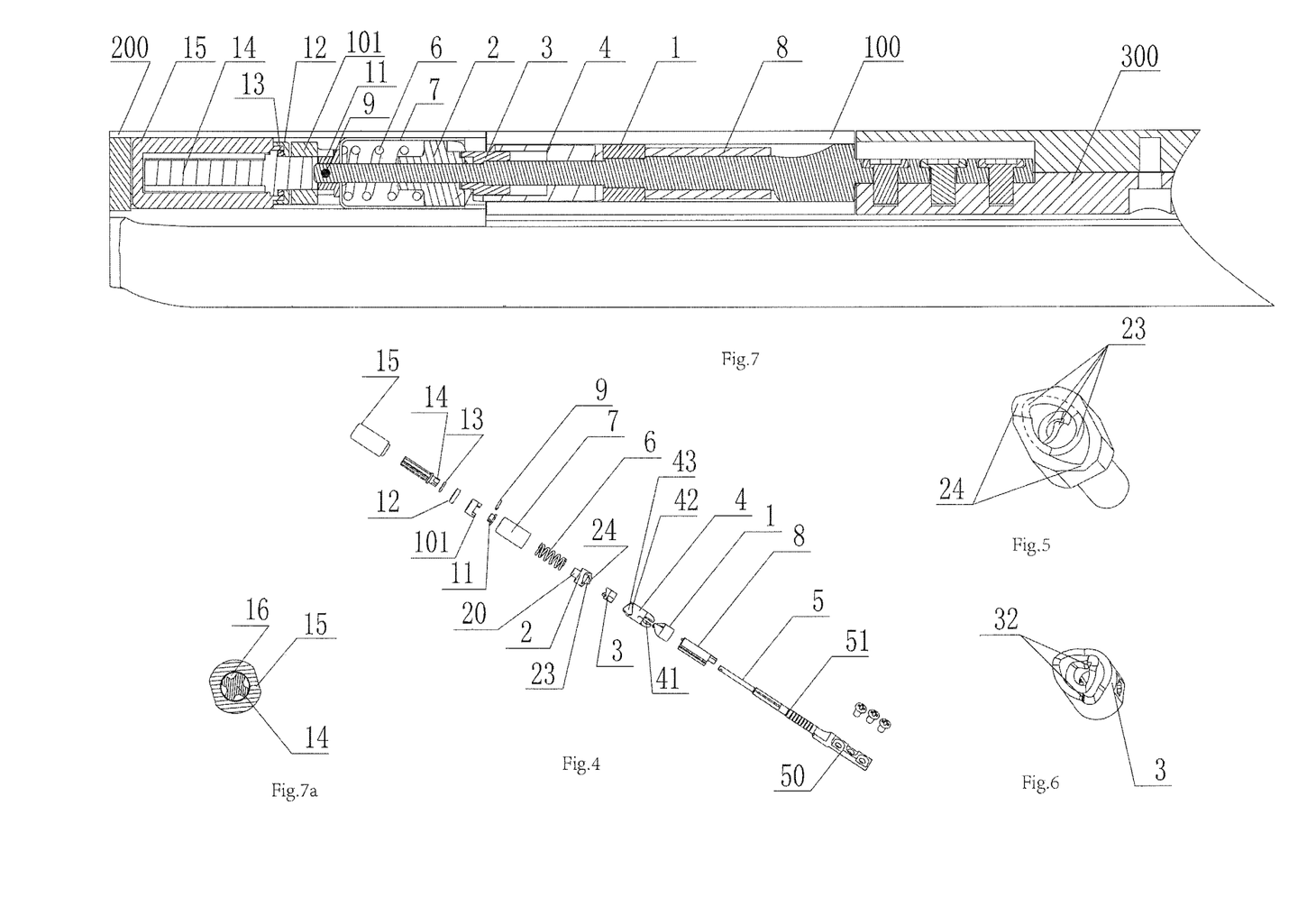
FIG. 4 is an exploded view of a hinge provided by the present utility model.
FIG. 5 is a schematic view of a second cam.
FIG. 6 is a schematic view of a fixed cam.
FIG. 7 is a cross-sectional view of a hinge provided by the present utility model when both the first rotating bracket and the second rotating bracket are at the maximum opening angle.
FIG. 7a is a cross-sectional view of a damper assembly of the present utility model.
Figures 8, 9, 9A:
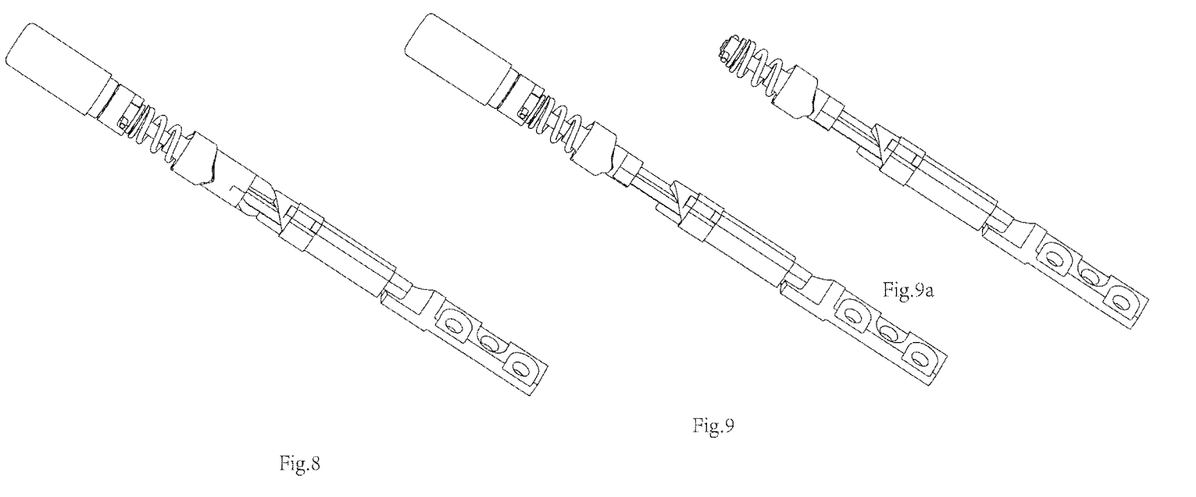
FIG. 8 is a schematic view of a hinge provided by the present utility model in a closed state when the first rotating bracket, the second rotating bracket, and the No. 7 housing are hidden.
FIG. 9 is a schematic view of the hinge after the slide cam is hidden in the state shown in FIG. 8.
FIG. 9a is a schematic view of the hinge after the damping mechanism and coupling are hidden in the state shown in FIG. 9.
Figure 10:
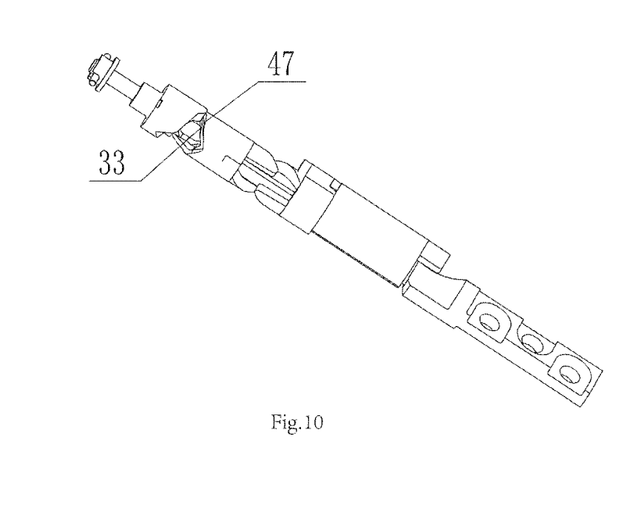
FIG. 10 is a schematic view of a hinge provided by the present utility model with the first rotating bracket and the second rotating bracket hidden after the first bracket is rotated to a critical angle.
Figure 11:
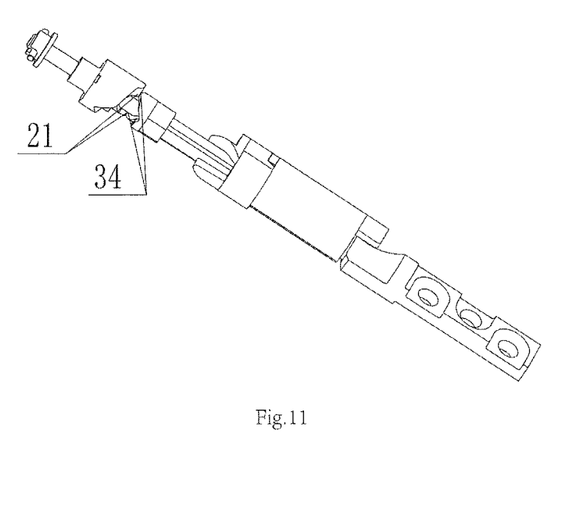
FIG. 11 is a schematic view of the hinge after the slide cam is hidden in the state shown in FIG. 10.
Figures 12, 13, 14:
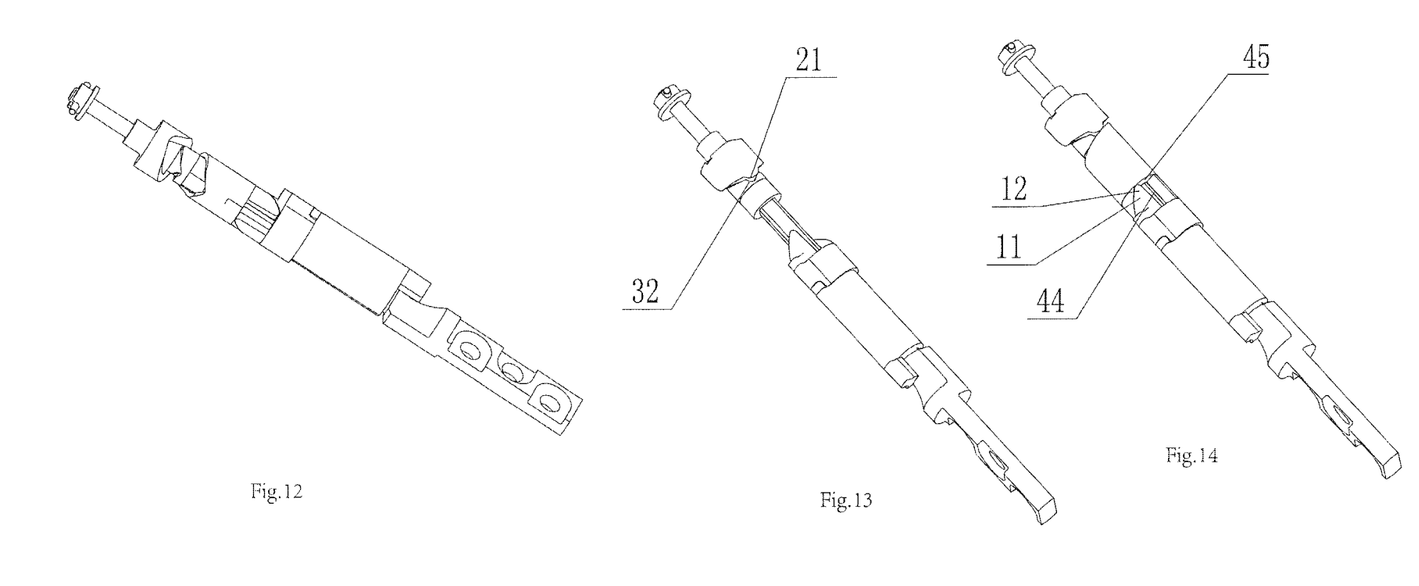
FIG. 12 is a schematic view of a hinge provided by the present utility model with the first rotating bracket and the second rotating bracket hidden after the first bracket is rotated to a critical angle and the second rotating bracket is opened to the maximum opening angle.
FIG. 13 and FIG. 14 are schematic views of the hinge after the slide cam is hidden in the state shown in FIG. 12.
Figure 15:
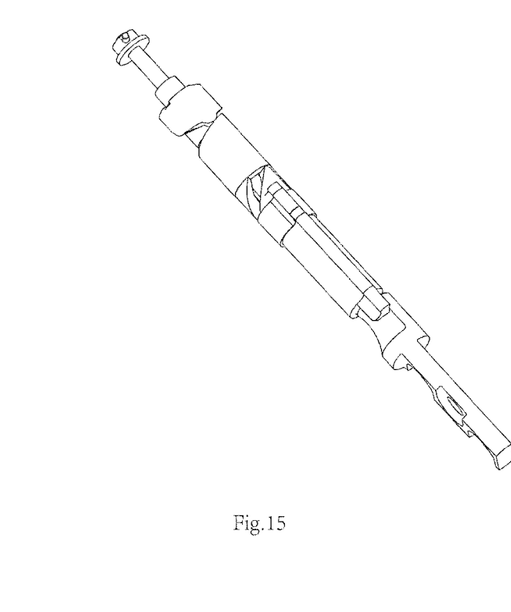
FIG. 15 is a schematic view of a hinge provided by the present utility model after the first rotating bracket is rotated to the maximum opening angle and the first rotating bracket and the second rotating bracket are hidden, based on the state shown in FIG. 12.
Figure 16:
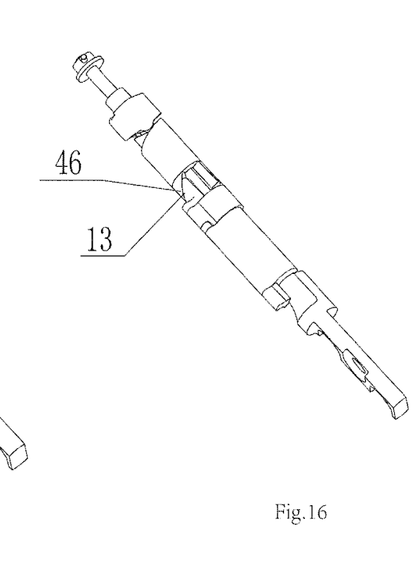
FIG. 16 is a schematic view of a hinge provided by the present utility model, in which the first rotating bracket is rotated to just below the critical angle, and the first rotating bracket and the second rotating bracket are hidden.
Figure 17:
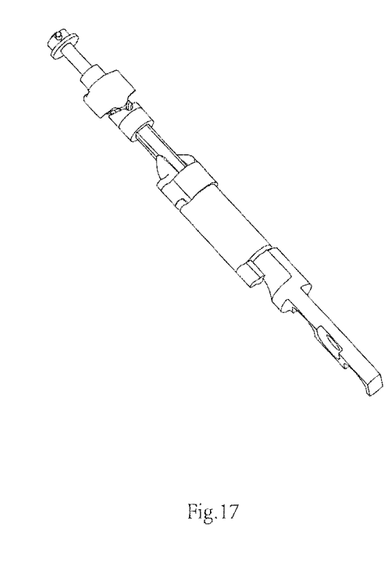
FIG. 17 is a schematic view of the hinge after the slide cam is hidden in the state shown in FIG. 16.
Figures 18, 18A:
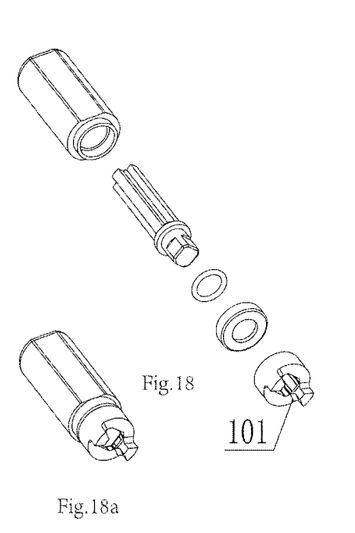
FIG. 18 is an exploded view of a damp component and a coupling.
FIG. 18a is a schematic view of a combination of a damper component and a coupling.
Figure 19:
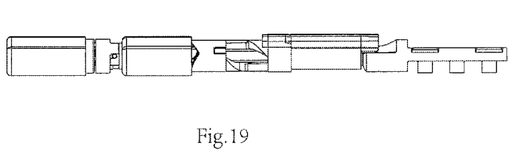
FIGS. 19 and 19a are respectively a schematic view and a cross-sectional view of the utility model when the rotating shaft and the damper are in the closed position, that is, the angle between the first rotating bracket and the second rotating bracket is 0 degree. The illustrated starting angle for opening of the shaft pin 9 and the coupling 101.
Figure 19A:
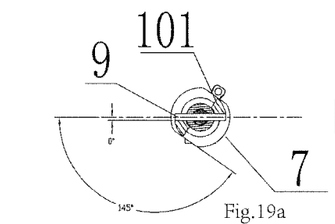
Figure 20:
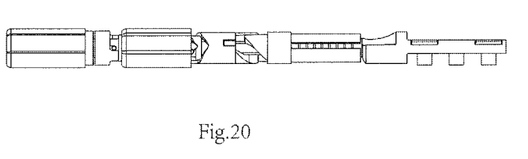
FIGS. 20 and 20a are respectively a schematic view and a cross-sectional view of the utility model when the second rotating bracket is automatically opened to 124 degrees, that is, the coupling 101 is rotated by 124 degrees with respect to the shaft pin 9, and at this time, the housing 7 and the coupling 101 rotate by 124 degrees synchronously. At this stage, the damper does not work.
Figures 20A, 21A:
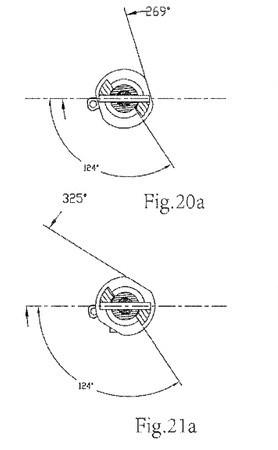
FIG. 21, 21a are respectively a schematic view and a cross-sectional view of the utility model when the second rotating bracket is rotated from the state of FIG. 20 to the fully open state of FIG. 21, in which the shaft pin 9 and the coupling 101 do not rotate relative to each other, but the coupling 101 and the housing 7 rotate relatively to produce a damping force (because the damper housing 15 and housing 7 always rotate synchronously).
Figure 21:
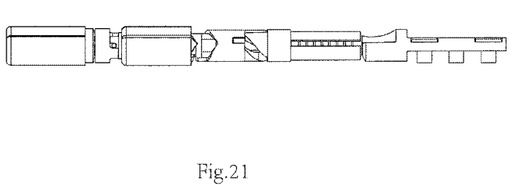

Referring to the figures, a hinge for rotating part provided herein, comprising a rotating shaft 5, wherein the hinge comprises a first set of rotating components (including parts 1, 8, first rotating bracket 100) and a second set of rotating components (including parts 2, 7, 15 and a second rotating bracket 200), the parts of first set of rotating components rotate synchronously, and the parts of the second set of rotating components rotate synchronously. The parts of first set of rotating components rotate around the rotating shaft 5 synchronously, and the parts of second set of rotating components also around the rotating shaft 5 synchronously, the second set of rotating components comprises a cam 2 that can slide along the rotating shaft and rotate around the rotating shaft; the hinge is further provided with a damper (including parts 12, 13, 14, 15), and the damper is connected with the rotating shaft by a clutch mechanism (including parts 9, 10, 11), when the rotation stroke of the cam 2 that can slide along the rotating shaft 5 and rotate around the rotating shaft in any direction is close to end, the damper is connected to the rotating shaft by the clutch mechanism, and when the rotation stroke of the cam 2 that can slide along the rotating shaft and rotate around the rotating shaft in any direction starts, the clutch component 10 at the end of the damper is not connected to the shaft pin 9 at the end of the rotating shaft 5.

The damper is provided with a shaft 14 and a connecting housing 15, the connecting housing 15 is a component in the second set of rotating components, which can be connected with the second rotating bracket 200, and damping oil 16 is disposed between the shaft 14 and the connecting housing 15, the clutch mechanism comprises a coupling 101 and a pin 9 cooperating with the coupling 101, the coupling 101 is connected with the shaft 14 of the damper by an interference fit, and the pin 9 is connected with the rotating shaft 5.

The hinge may be a hinge having other structures that have the first set of rotating components, the second set of rotating components and can rotate around the shaft. For damper, a spring-type or other structure of damper may also be used.

The first rotating component comprises a first cam 1 and a first rotating bracket 100, the first cam being axially positioned outside the rotating shaft 5 and rotating around the rotating shaft 5; the first cam 1 and the first rotating bracket 100 are coupled for simultaneous rotation, and the axial positioning can utilize a step 51 on the rotating shaft and the limit connecting piece 11 that can be assembled with the rotating shaft.

The second set of rotating components further comprises a second rotating bracket 200, and the cam 2 in the second rotating component being a second cam; the second cam 2 is synchronously rotated by the connection of the housing 7 and the second rotating bracket 200, and the second cam 2 is sleeved outside the rotating shaft 5, with a round hole clearance fit therebetween.

The hinge further comprises a fixed cam 3, which is fixed on the rotating shaft 5 and cannot be displaced, for example, fixed engagement with the rotating shaft 5, and it can be connected to the rotating shaft 5 by means of welding or pin connection or interference fit, etc.

The hinge further comprises a slide cam 4 which is sleeved outside the rotating shaft 5 and cannot rotate relative to the rotating shaft but can slide along the rotating shaft. The slide cam 4 can be slidably connected to the rotating shaft 5 through a flat hole;

The first cam 1 and the second cam 2 are respectively positioned outside the two ends of the slide cam 4 and cooperate with the slide cam 4, and the two ends of the slide cam 4 have a first cam structure 41 that cooperates with the first cam 1 and a second cam structure 42 that cooperates with the second cam 2 respectively;

The second cam 2 is provided with a third cam structure 23 that cooperates with the fixed cam 3 and a fourth cam structure 24 that cooperates with the slide cam 4 and the second cam structure 42;

The hinge is further provided with a spring 6 for applying a thrust to the second cam 2 in the direction of the slide cam 4;

When the hinge is in a closed state, relying on the thrust of the spring 6 on the second cam 2 and the cooperation of the third cam structure 23 and the fixed cam 3, the second cam 2 has a tendency to rotate toward the closing direction of the second rotating bracket 200, and the second rotating bracket 200 has a downward pressure on the first rotating bracket 100 to provide a locking force of the hinge.

The hinge is provided with a housing 7 in which the spring 6 and the second cam 2 are located, the housing 7 is fixedly connected with the second rotating bracket 200, and the second cam 2 and the housing 7 are slidably connected but cannot be relatively rotated, such that the second cam 2 is connected with the second rotating bracket 200 via the housing 7, and the second cam 2 can slide relative to the housing 7. One end of the rotating shaft 5 passes through the housing 7 and is supported on the housing 7.

The side of the slide cam 4 near the first cam is slidably connected to the rotating shaft 5, and the side of the slide cam 4 near the second cam 2 has a space 43 for accommodating the fixed cam 3, and the fixed cam 3 is in the space 43 when the hinge is in a closed state.

A torque mechanism is disposed between the first rotating bracket 100 and the rotating shaft 5, the torque mechanism may be a friction mechanism, comprising a friction sleeve 8, and the first rotating bracket 100 is connected with a friction sleeve 8 sleeved outside the rotating shaft 5, and the friction sleeve 8 and the rotating shaft 5 are an interference fit, to provide a function for the first rotating bracket 100 to stop rotating and maintain a rotation angle at any time.

The second cam 2 is provided with an extension sleeve 20, and the extension sleeve 20 is slidably and rotationally engaged with the rotating shaft 5, to increase the stability of the second cam 2, and the spring 6 is sleeved outside the extension sleeve 20.

The third cam structure 23 and the fourth cam structure 24 of the second cam 2 are respectively positioned on end faces of concentric rings having different radii on the second cam, and the third cam structure 23 is positioned on the end face of inner ring of the second cam, the fourth cam structure 24 is positioned on the end face of the ring outside the inner ring, and the cooperation of the second cam 2 and the slide cam 4 and the cooperation of the second cam 2 and the fixed cam 3 are switched at different stages of opening and closing of the hinge. At a stage, the third cam structure 23 and the fixed cam 3 cooperate while the slide cam 4 does not work for the second cam 2. At another stage, the fixed cam 3 and the slide cam 4 works together, and at this stage, the third cam structure 23 and the fixed cam 3 cooperate and the second cam structure 42 and the fourth cam structure 24 also cooperate. If necessary, at a stage, the second cam structure 42 and the fourth cam structure 24 of the slide cam cooperate while the fixed cam 3 does not work, to achieve the rotation of second rotating bracket 200 according to the designed procedure.

The cam surfaces of the first cam 1, second cam 2, fixed cam 3 and slide cam 4 can be designed according to different target procedures. For example, it can achieve the following: the second rotating bracket 200 has the synchronous opening function with the first rotating bracket 100, and when the first rotating bracket 100 is opened to a certain angle (critical angle), the second rotating bracket 200 is automatically opened to the best supporting angle, and after the second rotating bracket 200 is automatically opened to the best supporting angle, the first rotating bracket 100 can freely rotate within a certain angle range without affecting the second rotating bracket 200. When the first rotating bracket 100 is rotated to a critical angle, the second rotating bracket 200 can automatically rotate and recover, and finally spring back to provide the locking force for closing the hinge. In the cooperation of this type of cams, the hinge has a critical angle, a maximum opening angle of the second rotating bracket 200, a maximum opening angle of the first rotating bracket 100; the critical angle is smaller than the maximum opening angle of the first rotating bracket, and the maximum opening angle of the first rotating bracket is smaller than the maximum opening angle of the second rotating bracket.

The critical angle may be an acute angle between 45° and 90°, corresponding to the commonly used minimum angle (for example, the commonly used minimum angle relative to the keyboard when the screen is opened, e.g. 85°), the maximum opening angle of the first rotating bracket 100 may be an obtuse angle, corresponding to the commonly used maximum angle (for example, the commonly used maximum angle relative to the keyboard when the screen is opened, e.g. 135°), the maximum opening angle of the second rotating bracket 200 is the optimal support angle, for example, slightly more than 180°.

During the process from hinge closed state to the critical angle rotated by the first rotating bracket, the second rotating bracket 200 is driven by the rotation of the first rotating bracket 100 to drive the second cam 2 to rotate, at the same time, the second cam 2 climbs along the fixed cam 3 such that the second cam slides away from the first cam when rotating, to compress the spring 6; during the process, the slide cam 4 does not work on the first cam 1 and the second cam 2; and when reaching the critical angle, the bump 21 of the cam 2 cooperates with the bump 34 of the fixed cam 3.

After rotating to a critical angle during the opening process, the second rotating bracket 200 is automatically opened to a maximum opening angle by the thrust of the spring 6 and the cooperation of the cam 2 and the fixed cam 3. The maximum opening angle corresponds to the maximum rotation angle of the second rotating bracket 200, and in this process, the cooperation of cam is a cooperation of the bump 21 and the pit 32, to the second cam 2 (second rotating bracket 200) to rotate, and the second cam 2 is pushed by the spring 6 to slide toward the first cam 1 and drive the slide cam 4 to slide toward the first cam 1; at the place with the maximum opening angle of the second rotating bracket, the cooperation of the third cam structure 23 and the fixed cam 3 may be the cooperation of the pit 32 and the bump 21 to provide the support and locking functions at the maximum angle. When the second rotating bracket is opened to close to the maximum angle, the pin 9 collides with the slot wall of the coupling 101, and the damper functions to slow down the speed neat the end point, while before that, the pin 9 slides in the slot of the coupling 101.

After the critical angle, there are a slot 44 and an insertion portion 11 that are interposed each other and allow the first cam 1 to rotate by a certain angle between the first cam 1 and the first cam structure 41, and the certain angle is the difference between the opening of the second rotating bracket 200 to its maximum opening angle and the opening of the first rotating bracket 100 to the maximum angle, in which the first cam 1 and the first cam structure 41 are the cooperation of the top 12 with the plane 45, without interaction between them, and the first am 1 does not push the slide cam 4 to slide. When the first rotating bracket 100 continues to rotate beyond the critical angle during the opening, the second cam 2 pushes the slide cam 4 to slide to the first cam 1, and the insertion portion 11 falls into the slot 44.

During the rotation from the critical angle to the closing of the first rotating bracket 100, the first cam 1 pushes the slide cam 4 to slide toward the second cam 2, and the cooperation of the first cam 1 and the first cam structure 41 may be a cooperation of the inclined surface 13 and the inclined surface 46; in addition, with the cooperation of the fourth cam structure 24 and the second cam structure 42 and the cooperation of the third cam structure 23 and the fixed cam 3, the second cam 2 rotates toward the critical angle along the closing direction at a speed faster than the first rotating bracket 100 and slides away from the first cam 1 to compress the spring. The cooperation of the fourth cam structure 24 and the second cam structure 42 and the cooperation of the third cam structure 23 and the fixed cam 3 can be cooperation of the bump 21 and the pit 32 and the inclined surface 42. The bumps of the fourth cam structure 24 and the third cam structure 23 have the same height, that is, the bump 21.

After rotating to a critical angle during the closing process, the second rotating bracket 200 is automatically rotated to close and push the second cam toward the first cam by the thrust of the spring 6 and the cooperation of the third cam structure 23 and the fixed cam 3 or the cooperation of the fourth cam structure 24 and the second cam structure 42, at this time, it is the cooperation of the bump 21 and the inclined surface 33 or the inclined surface 47, to guide the rotation of the second cam 2 (second rotating bracket 200). The inclined surface 47 can not only leave a space, but also provide a closing locking pressure to the cam 2. When the second rotating bracket 200 approaches the closing angle, the pin 9 collides with the slot wall of the coupling 101, and the damper functions to slow down the speed near the end point, while before that, the pin 9 is in a sliding separation state in the slot of the coupling 101.

The present utility model can be applied to various mobile terminals such as supporting and rotating shaft of communication device, tablet computers and notebook computers, and two-in-one notebook, PADs and IPAD support frames and rotary shafts, and so on.

Taking PAD as an example, the mobile terminal comprises a first body 300 and a second body 400. The rotating shaft 5 is coupled to the first body 300 via a fixing plate 50 thereon, and the second body 400 is coupled to the first rotating bracket 100. The first body is provided with a keyboard, and the second body 400 is a PAD, provided with a screen.

The above description is merely specific embodiments of the present utility model, but the structural features of the present utility model are not limited thereto. Any changes or modifications made by those skilled in the art in the field of the present utility model shall fall into the scope of protection of the present utility model.

The invention claimed is:

1. A hinge for rotating part, comprising a rotating shaft, wherein the hinge comprises:
a first set of rotating components axially positioned outside the rotating shaft and configured to rotate around the rotating shaft, the first set of rotating components comprising:
a first cam; and
a first rotating bracket;
a second set of rotating components configured to rotate around the rotating shaft, the second set of rotating components comprising:
a second cam; and
a second rotating bracket;
a fixed cam fixed on the rotating shaft, the fixed cam configured such that it cannot be displaced and rotated relative to the rotating shaft;
a slide cam sleeved outside the rotating shaft and configured such that it cannot rotate relative to the rotating shaft but can slide along the rotating shaft, wherein the first cam and the second cam are respectively positioned outside two ends of the slide cam and cooperate with the slide cam, and the two ends of the slide cam have a first cam structure that cooperates with the first cam and a second cam structure that cooperates with the second cam respectively, and wherein the second cam is provided with a third cam structure that cooperates with the fixed cam and a fourth cam structure that cooperates with the slide cam and the second cam structure; and
a spring for applying a thrust to the second cam in a direction of the slide cam,
wherein when the hinge is in a closed state, the second rotating bracket provides a locking force of the hinge relying on a thrust of the spring to the second cam and the cooperation of the third cam structure and the fixed cam.

2. The hinge for rotating part according to claim 1, wherein the side of the slide cam near the first cam is slidably connected to the rotating shaft, and the side of the slide cam near the second cam has a space for accommodating the fixed cam, and the fixed cam is in the space when the hinge is in a closed state.

3. The hinge for rotating part according to claim 1, wherein a torque mechanism is disposed between the first rotating bracket and the rotating shaft, to provide a function for the first rotating bracket to stop rotating and maintain a rotation angle at any time.

4. The hinge for rotating part according to claim 1, wherein the hinge is provided with a housing, the spring and the second cam are in the housing, the housing is fixedly connected with the second rotating bracket, and the second cam is slidably connected with the housing but cannot rotate relative to each other.

5. The hinge for rotating part according to claim 1, wherein the third cam structure and the fourth cam structure of the second cam are respectively positioned on end faces of concentric rings having different radii on the second cam, and the third cam structure is positioned on the end face of inner ring of the second cam, the fourth cam structure is positioned on the end face of the ring outside the inner ring, and the cooperation of the second cam and the slide cam and the cooperation of the second cam and the fixed cam are switched at different stages of opening and closing of the hinge.

6. The hinge for rotating part according to claim 1, wherein the hinge has a critical angle, a maximum opening angle of a second rotating bracket, a maximum opening angle of a first rotating bracket; the critical angle is smaller than the maximum opening angle of the first rotating bracket, and the maximum opening angle of the first rotating bracket is smaller than the maximum opening angle of the second rotating bracket;
during the process from hinge closed state to the critical angle rotated by the first rotating bracket, the second rotating bracket is driven by the rotation of the first rotating bracket to drive the second cam to rotate, at the same time, the second cam climbs along the fixed cam such that the second cam slides away from the first cam when rotating, to compress the spring;
after rotating to a critical angle during the opening process, the second rotating bracket is automatically opened to a maximum opening angle by the thrust of the spring and the cooperation of the third cam structure and the fixed cam;
after the critical angle, there are a slot and an insertion portion that are interposed each other and allow the first cam to rotate by a certain angle between the first cam and the first cam structure of the slide cam, and the certain angle is an angle to allow the first rotating bracket to be adjusted at random after the second rotating bracket is opened to the maximum opening angle of the second rotating bracket, and the second rotating bracket is kept at the maximum opening angle, when the first rotating bracket continues to rotate beyond the critical angle during the opening, the second cam pushes the slide cam to slide to the first cam, and the insertion portion falls into the slot;
during the rotation from the critical angle to the closing of the first rotating bracket, the first cam pushes the slide cam to slide toward the second cam, and with the cooperation of the fourth cam structure and the second cam structure and the cooperation of the third cam structure and the fixed cam, the second cam rotates toward the critical angle along the closing direction at a speed faster than the first rotating bracket and slides away from the first cam to compress the spring;
after rotating to a critical angle during the closing process, the second rotating bracket is automatically rotated to close and push the second cam toward the first cam by the thrust of the spring and the cooperation of the third cam structure and the fixed cam or the cooperation of the fourth cam structure and the second cam structure.

7. The hinge for rotating part according to claim 6, wherein the cooperation of the third cam structure and the fixed cam is the cooperation of a pit and a bump corresponding to the maximum rotation angle of the second rotating bracket.

8. A mobile terminal comprising
a first body;
a second body that are rotationally connected; and
the hinge according to claim 1,
wherein the rotating shaft is connected with the first body, and the second body is connected with the first rotating bracket.

* * * * *